(12) United States Patent
Hayashi

(10) Patent No.: US 7,970,139 B2
(45) Date of Patent: Jun. 28, 2011

(54) DECRYPTING OVERLAPPING SELECTED AND ENCRYPTED IMAGE AREAS

(75) Inventor: Junichi Hayashi, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 982 days.

(21) Appl. No.: 11/571,009

(22) PCT Filed: Aug. 31, 2005

(86) PCT No.: PCT/JP2005/016364
§ 371 (c)(1),
(2), (4) Date: Dec. 20, 2006

(87) PCT Pub. No.: WO2006/028103
PCT Pub. Date: Mar. 16, 2006

(65) Prior Publication Data
US 2008/0279380 A1 Nov. 13, 2008

(30) Foreign Application Priority Data
Sep. 7, 2004 (JP) ................................. 2004-259633

(51) Int. Cl.
*H04N 1/44* (2006.01)
(52) U.S. Cl. ........................................ 380/243; 713/176
(58) Field of Classification Search .................. 713/176; 380/243
See application file for complete search history.

(56) References Cited

U.S. PATENT DOCUMENTS

| | | | |
|---|---|---|---|
| 5,533,127 A | 7/1996 | Luther | ............................. 380/28 |
| 6,473,859 B1 | 10/2002 | Enokida | ........................ 713/164 |
| 6,535,616 B1 | 3/2003 | Hayashi et al. | |
| 6,598,161 B1 * | 7/2003 | Kluttz et al. | .................. 713/166 |
| 6,741,758 B2 | 5/2004 | Hayashi et al. | |
| 6,826,290 B1 | 11/2004 | Murakami et al. | |
| 6,839,844 B1 * | 1/2005 | Okano | .......................... 713/176 |
| 6,873,711 B1 | 3/2005 | Murakami et al. | |
| 6,993,148 B1 | 1/2006 | Miyashita et al. | |
| 7,006,257 B1 | 2/2006 | Yamazaki et al. | |
| 7,142,689 B2 | 11/2006 | Hayashi et al. | |
| 2002/0199106 A1 | 12/2002 | Hayashi | |

(Continued)

FOREIGN PATENT DOCUMENTS

| | | |
|---|---|---|
| EP | 1487148 | 12/2004 |
| JP | 08-034587 | 2/1991 |
| JP | 07-225550 | 8/1995 |
| JP | 2003-324418 | 11/2003 |
| WO | WO 03/073691 | 9/2003 |

OTHER PUBLICATIONS

Hiroshi Fujii, Yasushi Yamanaka, "Scrambling Digital Image Data for Copyright Protection", The 1996 Symposium on Cryptography and Information Security, SCIS96, Jan. 29, 1996, p. 1-8.

(Continued)

*Primary Examiner* — Jason K Gee
(74) *Attorney, Agent, or Firm* — Fitzpatrick, Cella, Harper & Scinto

(57) ABSTRACT

The present invention aims to provide the technique of appropriately enabling the encryption and decryption to the partial area with respect to the image data to which the partial encryption and the multiple encryptions have been applied. More specifically, the predetermined image area in the image data is acquired by a reproduction area designation unit, the overlap area of the acquired image area and the encrypted encryption area is calculated by an overlap judgment unit, the key information corresponding to the calculated overlap area is acquired by a decryption key acquisition unit, and the image data corresponding to the overlap area is subjected to the encryption and decryption by an image decryption unit by using the acquired key information.

8 Claims, 13 Drawing Sheets

U.S. PATENT DOCUMENTS

| | | |
|---|---|---|
| 2003/0059086 A1 | 3/2003 | Hayashi |
| 2003/0128863 A1 | 7/2003 | Hayashi |
| 2003/0190042 A1 | 10/2003 | Tagashira et al. ............... 380/45 |
| 2003/0202680 A1 | 10/2003 | Hayashi |
| 2003/0204812 A1 | 10/2003 | Hayashi |
| 2003/0231767 A1* | 12/2003 | Carbajal ...................... 380/200 |
| 2004/0003261 A1 | 1/2004 | Hayashi |
| 2006/0020809 A1 | 1/2006 | Hayashi |
| 2006/0033942 A1 | 2/2006 | Yamazaki et al. |
| 2006/0149762 A1 | 7/2006 | Suga et al. |
| 2006/0294385 A1 | 12/2006 | Hayashi |
| 2007/0127771 A1 | 6/2007 | Kaneda et al. |
| 2007/0150962 A1 | 6/2007 | Hayashi |

FOREIGN PATENT DOCUMENTS

OTHER PUBLICATIONS

Kazuhiro Oka et al., "A Signature Method for Image Data Using Partial Scrambling with the Generalized Peano Scan", Systems and Computers in Japan, vol. 31, No. 1, 2000, pp. 20-25 (English Translation).

May 25, 2009 European Search Report in Application No. 05782160. 5—1228/1759481 PCT/JP2005016364.

Notification of Reason for Refusal, dated Jul. 20, 2010, issued by the Japanese Patent Office in Japanese Application No. 2006-307763 (partial English translation).

* cited by examiner

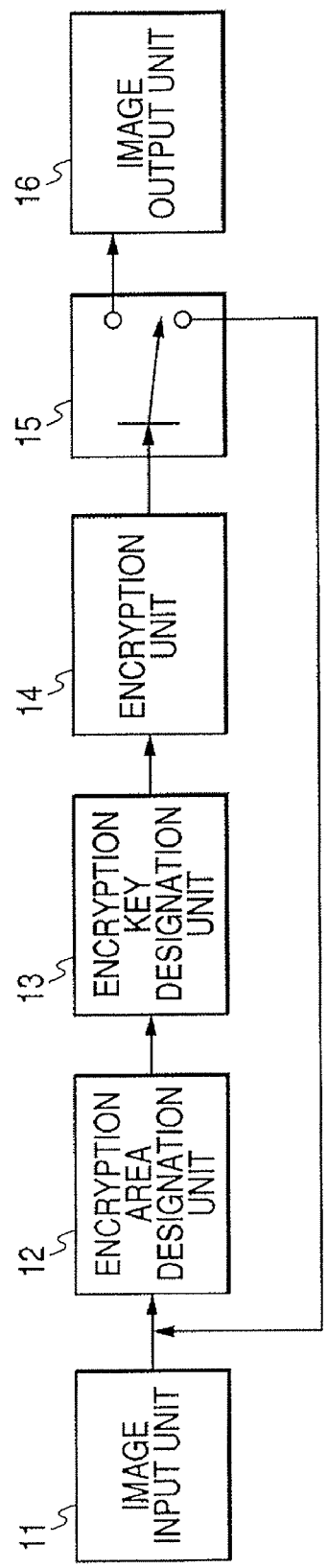

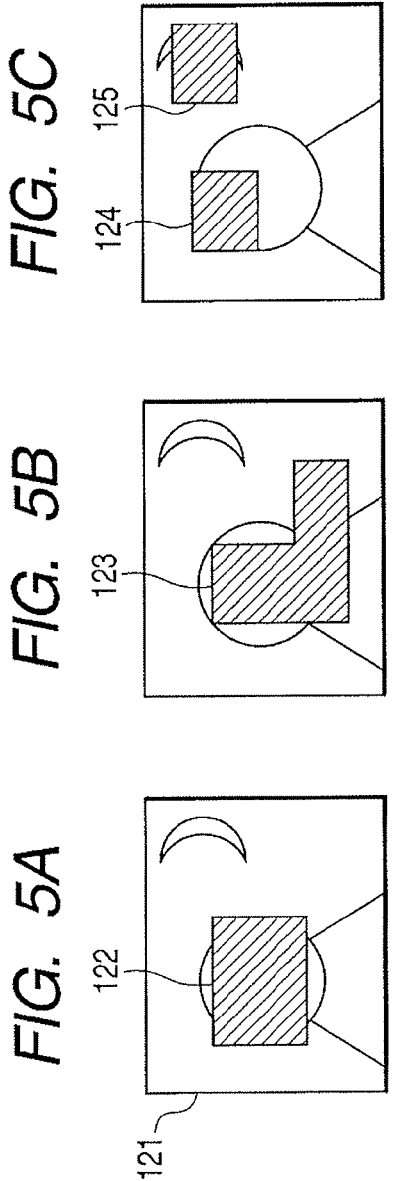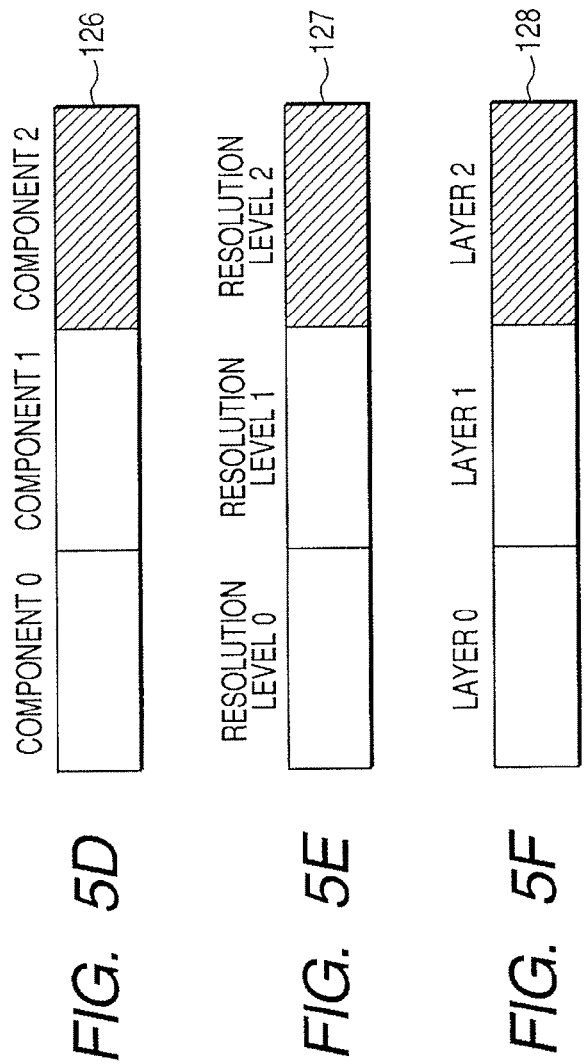

FIG. 9A

| ENCRYPTION AREA INFORMATION | OVERLAP AREA INFORMATION |
|---|---|
| Z1 | VZ1 |
| Z2 | VZ2 |

FIG. 9B

| ENCRYPTION AREA INFORMATION | OVERLAP AREA INFORMATION | KEY INFORMATION |
|---|---|---|
| Z1 | VZ1 | K1 |
| Z2 | VZ2 | K2 |

FIG. 9C

| ENCRYPTION AREA INFORMATION | OVERLAP AREA INFORMATION | KEY INFORMATION | ENCRYPTION ORDER INFORMATION |
|---|---|---|---|
| Z1 | VZ1 | K1 | 1 |
| Z2 | VZ2 | K2 | 2 |

# DECRYPTING OVERLAPPING SELECTED AND ENCRYPTED IMAGE AREAS

TECHNICAL FIELD

The present invention relates to a technique for encryption and decryption of image data.

BACKGROUND ART

Conventionally, with the aim of controlling access to image data and the like, the image data is encrypted and scrambled. More specifically, the image data is encrypted using an encryption key, whereby only the person who has the decryption key corresponding to the relevant encryption key can correctly reproduce the encrypted image data.

Partial encryption is known as one of the methods of encrypting the image data. More specifically, partial encryption is a technique of not encrypting data of the whole image but instead selecting and encrypting a partial area of the image data (for example, see U.S. Pat. No. 6,473,859).

Further, partial decryption is known as one of the methods of decrypting the encrypted image data. More specifically, partial decryption is a technique of not decrypting encrypted data for a whole image but instead selecting and decrypting a partial area of the encrypted image data (for example, see Published United States Patent Application 2003/0190042).

Moreover, multiple encryption, which involves encrypting the image data several times, is known. Here, multiple encryptions is a technique to be used when the encrypted image data is further encrypted.

That is, by appropriately using partial encryption, partial decryption or multiple encryption, it is possible to achieve flexible control of access to the image data.

However, in the past, partial encryption, partial decryption and multiple encryption have not been used in combination, and a method of reproducing an image in a case where partial encryption, partial decryption and multiple encryption are appropriately combined and applied to image data has not been disclosed.

Incidentally, in a case where image data subjected to multiple encryptions in a certain encryption order is decrypted, the decryption must be executed in the order opposite to the certain encryption order. In that case, the following problems may occur. That is, if the partial-encrypted and multiple-encrypted image data is subjected to partial decryption, it is impossible to specify which of the relative areas has been subjected to the multiple encryptions. Thus, there is a possibility that a key which is unnecessary for the decryption is unnecessarily acquired. In addition, it is impossible to specify the decryption order with respect to the areas to be decrypted and reproduced. Thus, there is a possibility that the partial decryption cannot be executed, whereby the whole areas subjected to the multiple decryptions are unnecessarily decrypted.

DISCLOSURE OF THE INVENTION

The present invention has been developed in consideration of the above conventional problems, and an object thereof is to provide a technique for appropriately enabling partial decryption of image data which has been subjected to partial encryption and multiple encryptions.

Moreover, to achieve the above object, the present invention is characterized by comprising: an area acquisition step of acquiring a predetermined image area in image data; an area calculation step of calculating an overlap area between the acquired predetermined image area and an encrypted encryption area; a key information acquisition step of acquiring key information corresponding to the overlap area calculated in the area calculation step; and a decryption step of executing a decryption process on the image data corresponding to the overlap area, by using the key information acquired in the key information acquisition step.

Other objects, characteristics and advantages of the present invention will become apparent from the following detailed description taken in conjunction with the accompanying drawings.

BRIEF DESCRIPTION OF THE DRAWINGS

FIG. 4 is a block diagram showing the constitution of the image encryption processing unit according to the embodiment;

FIGS. 5A, 5B, 5C, 5D, 5E and 5F are diagrams for explaining the image area designation according to the embodiment;

FIGS. 9A, 9B and 9C are diagrams for explaining the decryption related information according to the embodiment;

BEST MODE FOR CARRYING OUT THE INVENTION

Explanation of Whole Constitution

Figure 1:
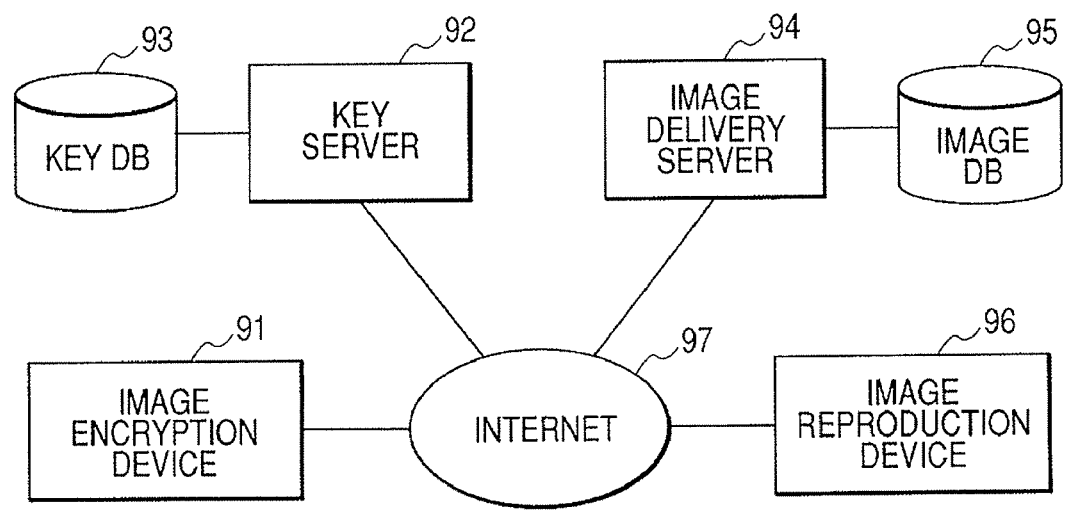
FIG. 1 is a schematic diagram showing the whole constitution of the system according to the embodiment of the present invention.

FIG. 1 shows an example of the whole constitution of the system according to the embodiment of the present invention. In FIG. 1, an image encryption device 91 executes an encryption process to the image data input through a scanner, a digital camera or the like, by using a predetermined key. A key server 92 delivers the key information stored in a key DB (database) 93 and necessary to decrypt the encrypted image data, in response to predetermined key information acquisition information. An image delivery server 94 delivers the image data stored in an image DB 95, in response to a predetermined image data acquisition request. An image reproduction device (or image viewer) 96 receives the image data, decrypts the encryption of the received image data, and reproduces the image data. Here, in FIG. 1, the functional blocks 91 to 96 are mutually connected through a network such as the Internet 97, whereby various data can be exchanged among these blocks 91 to 96. Incidentally, each of the functional blocks 91 to 96 may be a general-purpose device such as an ordinary personal computer or the like. Then, the actual process of the system will be explained hereinafter.

The image encryption device 91 executes the compression process and the encryption process to desired image data by using predetermined key information, and transmits the compressed and encrypted image data to the image delivery server 94. Simultaneously, the image encryption device 91 transmits to the key server 92 the key information used in the encryption process. Then, the key server 92 registers in the key DB 93 the received key information together with the information (e.g., an image ID (identification)) for specifying the corresponding image data.

An image viewer (that is, a person who views the image) requests the image delivery server 94 to deliver the desired image data and then receives the image data by using the image reproduction device 96. However, in that case, since the desired image data has been encrypted, the image viewer further requests the key server 92 to generate the key information for decrypting the encrypted image data. At that time, for example, the key server 92 may execute an appropriate authentication process to judge whether or not to be able to deliver the key information to the relevant viewer, and deliver the key information only in a case where it is judged to be able to deliver the key information. Thus, the key information is transmitted from the key server 92 to the image reproduction device 96 through the Internet 97, the encrypted image data is decrypted in the image reproduction device 96 by using the transmitted key information, and the image data is resultingly reproduced.

Incidentally, prior to the detailed explanation of the encryption process to be executed by the image encryption device 91, the image encryption process and an example of the operation screen (window) in the image reproduction process according to the embodiment will be explained with reference to FIG. 2.

Figure 2:
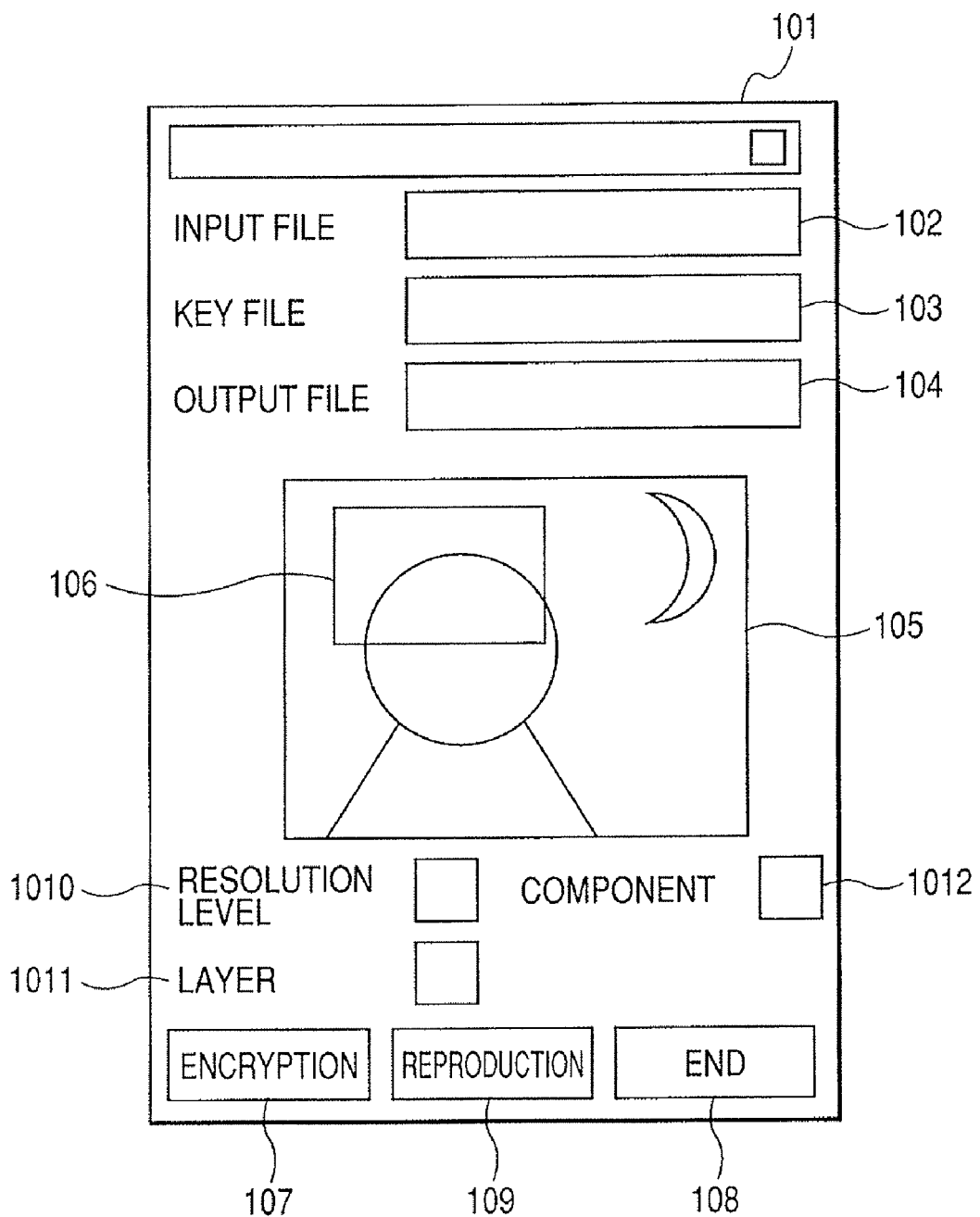
FIG. 2 is a diagram showing an example of the GUI (graphical user interface) screen in case of executing the encryption process according to the embodiment.

As shown in FIG. 2, a blank column 102 to be used for designating the input file including the image data to be encrypted or reproduced, a blank column 103 to be used for designating the key file including the key information necessary for the encryption, and a blank column 104 to be used for designating the output file including the image data being the encryption result or the reproduction result are arranged on the upper side of a window 101. Here, the item in each of the blank columns 102, 103 and 104 may be designated by directly inputting the file name with use of a later-described keyboard 1115 (FIG. 3), or selected from the file browser displayed by clicking the button arranged on the right of each blank column. The image data included in the file designated at the blank column 102 is displayed on an image viewer 105. In the embodiment, when the image encryption process is executed, the desired area intended to be concealed is selected, by using the mouse or the like, from the image data displayed on the image viewer 105, whereby only the selected area can be encrypted. Likewise, when the image reproduction process is executed, the desired area intended to be reproduced is selected by using the mouse or the like, whereby only the selected area can be reproduced. In FIG. 2, a rectangle 106 shows an example of the area to be selected. Typically, in the case where the desired reproduction area is designated by using the rectangle 106 in the image reproduction, it is difficult to determine which area in the image should be designated because the content of the relevant image is not at all displayed. In such a case, for example, it is possible to previously display the contents of the image in the image viewer 105 at low image quality and low resolution, and then reproduce (display) the high-quality and high-resolution image with respect to the area selected by using the rectangle 106. Moreover, in a case where the resolution level, the layer, the component or the combination thereof is designated instead of the spatial area of the image data, the index of the resolution level, the index of the layer and/or the index of the component are/is input respectively to a blank column 1010, a blank column 1011 and/or a blank column 1012.

Then, after the desired area was selected as above, if an encryption button 107 is depressed, the encryption process is executed to the image data corresponding to the selected area. Besides, if a reproduction button 109 is depressed, the decryption process is executed to the selected area, whereby the image data is reproduced. That is, after the encryption process or the decryption process was executed, redrawing is executed in the image viewer 105, whereby the image data subjected to the encryption process or the image data subjected to the decryption process is displayed in the image viewer 105. In the embodiment, particularly, after the encryption process was executed by depressing the encryption button 107, a rectangular area (or rectangle) different from the rectangle 106 is newly designated, and the encryption button 107 is again depressed, whereby it is possible to execute the encryption process plural times. Thus, after the encryption process was executed plural times, an end button 108 is finally depressed, whereby the image data is recorded in the file designated through the blank column 104.

Incidentally, the window shown in FIG. 2 is merely directed to one example which is applicable to the present invention. That is, it is apparent that the present invention is not limited to this.

Figure 3:
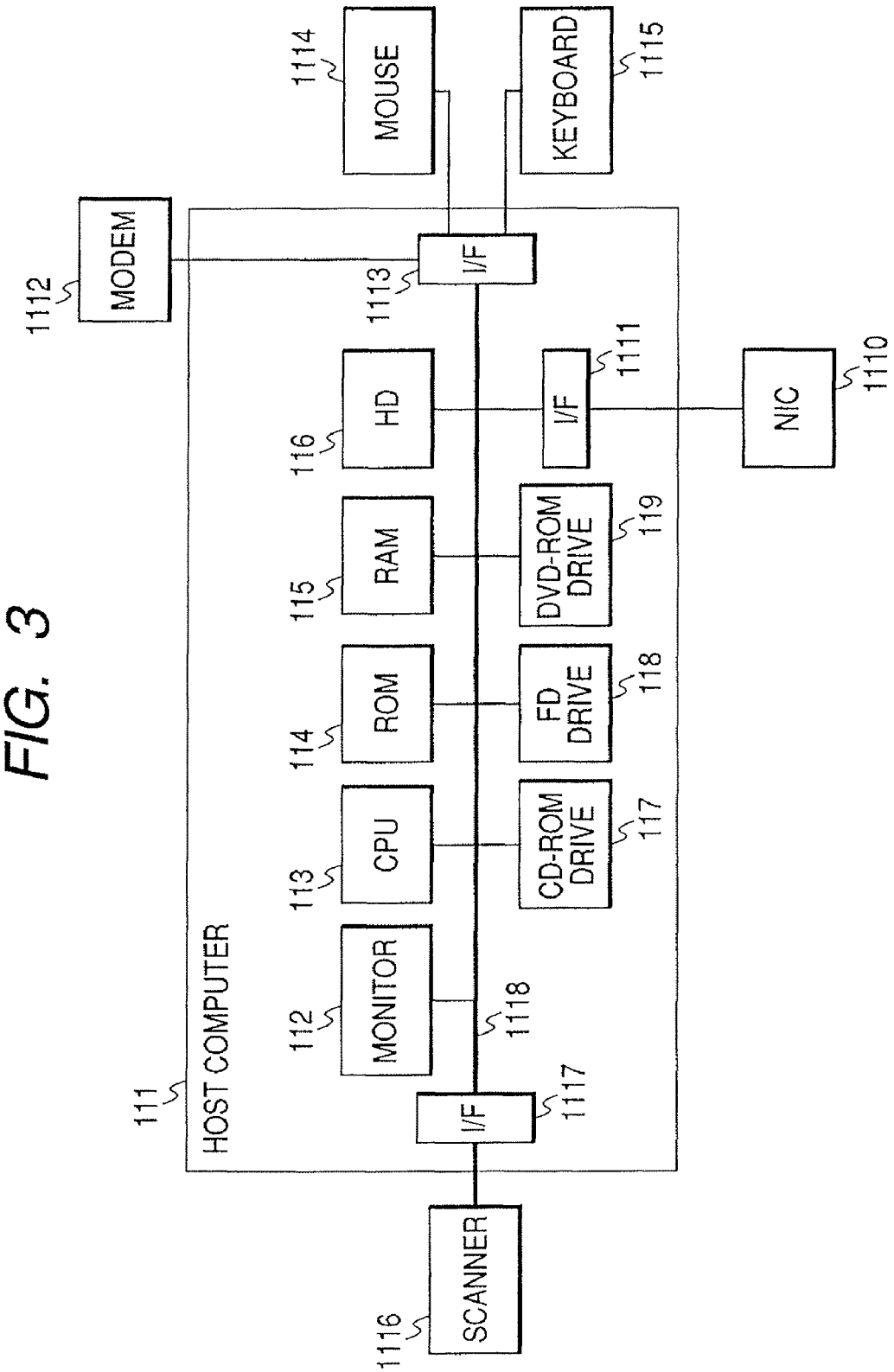
FIG. 3 is a block diagram showing the constitution of the host computer according to the embodiment.

Subsequently, the host computer which is applicable in the embodiment of the present invention will be explained with reference to FIG. 3. That is, FIG. 3 is the block diagram which shows the basic constitution of the host computer functioning as the image encryption device and the image reproduction device according to the embodiment, and also shows the relation between the host computer and its peripherals. In FIG. 3, a host computer 111 which is, for example, a popularized personal computer can input the image data from a scanner 1116 through an I/F (interface) 1117 and then edit and store the input image data. Moreover, the host computer 111 can distribute the acquired image data through the Internet or the like by using an NIC (network interface card) 1110 or a modem 1112. Here, it should be noted that various instructions and the like are input from a user through a mouse 1114 and the keyboard 1115. In the host computer 111, the later-described functional blocks are mutually connected through a bus 1118, whereby various data can be exchanged.

In FIG. 3, numeral 112 denotes a monitor which can display the various information from the host computer 111.

Numeral 113 denotes a CPU which can control the operations of the respective function blocks in the host computer 111 and execute the programs loaded into a later-described RAM 115. Numeral 114 denotes a ROM in which BIOS and the boot program have been stored. Numeral 115 denotes the RAM in which the programs and the image data to be processed are temporarily stored for the process by the CPU 113. Besides, the programs for causing the CPU 113 to execute the later-described various processes are loaded into the RAM 115.

Numeral 116 denotes an HD (hard disk) which is used to store the OS (operating system) and the programs to be transferred to the RAM and the like. Moreover, the HD 116 is used to store and read the image data while the host computer 111 is operating. Numeral 117 denotes a CD-ROM drive which can read/write the data from/to a CD-ROM (or CD-R) being an external storage medium.

Numeral 118 denotes an FD drive which can, as well as the CD-ROM drive 117, read/write the data from/to a Floppy™ disk. Moreover, numeral 119 denotes a DVD-ROM (or DVD-RAM) drive which can, as well as the CD-ROM drive 117, read the data from a DVD-ROM and read/write the data from/to a DVD-RAM. Incidentally, in a case where the image editing program is stored in the CD-ROM, the Floppy™ disk, the DVD-ROM or the like, the relevant program is once installed into the HD 116, and the installed program is then transferred to the RAM 115 according to need.

Numeral 117 denotes the I/F which interfaces the scanner 1116 with the bus 1118 so that the image data input from the scanner 1116 can be transferred to the HD 116 and the RAM 115 in the host computer 111.

Numeral 1111 denotes an I/F which interfaces the NIC 1110 with the bus 1118 so that the image data stored in the RAM 115, the HD 116, the CD-ROM drive 117, the FD drive 118, the DVD-ROM drive 119 and the like in the host computer 111 can be transferred to the NIC 1110. That is, the host computer 111 transmits/receives the data to/from the Internet through the I/F 1111.

Numeral 1113 denotes an I/F which interfaces the mouse 1114 and the keyboard 1115 with the host computer 111. Thus, various instructions are input from the mouse 1114 and the keyboard 1115 to the CPU 113 of the host computer 111 through the I/F 1113.

(Image Encryption Process)

FIG. 4 is a block diagram for explaining the image encryption process function and the method for achieving the image encryption process function, according to the embodiment. In FIG. 4, numeral 11 denotes an image input unit, numeral 12 denotes an encryption area designation unit, numeral 13 denotes an encryption key designation unit, numeral 14 denotes an encryption unit, numeral 15 denotes a switching unit, and numeral 16 denotes an image output unit.

Initially, the function of the image input unit 11 will be explained. The image data to be encrypted is input to the encryption area designation unit 12 through the image input unit 11.

More specifically, the image input unit 11 reads the image data previously stored in the ROM 114, the RAM 115, the HD 116, the CD-RO drive 117, the FD drive 118, the DVD-ROM drive 119 and the like shown in FIG. 3, and then inputs the read image data. Alternatively, the image input unit 11 receives the image data from the Internet 97 (FIG. 1) through the modem 1112 or the NIC 1110, and then uses the received image data. In addition, the image input unit 11 digitizes the image of the original printed on, e.g., a paper by using the scanner 1116 or the like, and then uses the digitized image data. That is, any input source can be applied in the embodiment. After then, the image data input through the image input unit 11 is once stored in the RAM 115.

Here, to simplify the following explanation, it is assumed that the image data has been compressed by the JPEG (Joint Photographic Experts Group) 2000 system standardized by the ISO (International Organization for Standardization). However, the present invention is not limited to this. That is, it is apparent that also the image data compressed by another JPEG system or the like and the image data not compressed can be applied.

Subsequently, the function of the encryption area designation unit 12 will be explained. That is, the encryption area designation unit 12 designates the area which is included in the input image data and intended to be encrypted, and outputs the area information concerning the designated area to the encryption unit 14.

In the embodiment, it is assumed that the area designated by the encryption area designation unit 12 is the spatial area of the image. Then, the area designated in the embodiment will be explained with reference to FIGS. 5A to 5F.

FIGS. 5A to 5F are the diagrams for explaining an example of the image area designation according to the embodiment. In FIGS. 5A to 5C, numeral 121 denotes a whole image, and numerals 122, 123, 124 and 125 respectively denote designated areas (to be encrypted). In the embodiment, the single rectangular area can be designated as shown in FIG. 5A, the single arbitrary-shaped area can be designated as shown in FIG. 5B, and further the plural areas can be designated as shown in FIG. 5C. Here, it should be noted that it is possible for the user to designate these areas by using the mouse 1114 or the like as browsing or consulting the image viewer 105 shown in FIG. 2. Alternatively, it is also possible to automatically designate the predetermined area previously registered in the RAM 115, the HD 116 and the like.

Incidentally, as the example of the area to be designated, the spatial area of the image is designated in the embodiment. However, the present invention is not limited to this. That is, it is apparent that the partial areas of various image data can be designated. For example, it is apparent that, in the image data of the JPEG 2000 system, the predetermined component (area 126) can be designated as shown in FIG. 5D, the predetermined resolution level (area 127) can be designated as shown in FIG. 5E, and the predetermined layer (area 128) can be designated as shown in FIG. 5F. Here, it should be noted that the indexes of these areas may be input respectively to the blank columns 1012, 1010 and 1011 shown in FIG. 2.

Subsequently, the function of the encryption key designation unit 13 will be explained. That is, the encryption key designation unit 13 designates the key information which corresponds to the area information concerning the area designated by the encryption area designation unit 12 at the previous stage, and then outputs the designated key information.

In the embodiment, the desired key information from among the key information previously stored in the key DB 93 is requested to the key server 92, and the key information transmitted from the key server 92 is then designated. Alternatively, it is possible to newly generate the key information in the encryption key designation unit 13 and designated the generated key information. In that case, the generated key information is registered together with the information (e.g., an image ID or the like) for specifying the image data in the key server 92, so as to be able to be used in the image decryption unit at the later stage. In any case, the key information which is different with respect to each area designated by the encryption area designation unit 12 is designated in the encryption key designation unit 13.

Subsequently, the function of the encryption unit 14 will be explained. That is, the image data, the encryption area information and the key information are input to the encryption unit 14. Then, in the encryption unit 14, only the data corresponding to the encryption area information from among the input image data is subjected to the encryption process by using the key information designated by the encryption key designation unit 13 at the previous stage. Then, the encrypted image data is output from the encryption unit 14.

Incidentally, the encryption algorithm for the encryption process is not specifically limited in the embodiment. That is, various encryption algorithms are applicable to the present invention. For example, the shared key encryption algorithm such DES (Data Encryption Standard), AES (Advanced Encryption Standard) or the like, and the published key encryption algorithm such as RSA (Rivest Shamir Adleman) or the like are applicable.

The encryption process in the encryption unit 14 is executed when the encryption button 107 shown in FIG. 2 is depressed. Then, after the encryption process was executed, the encrypted image (that is, the image of which the designated area has been scrambled) is redrawn in the image viewer 105.

Subsequently, the function of the switching unit 15 will be explained. More specifically, the switching unit 15 switches the two operations, that is, one is to again execute the encryption area designation process in the encryption area designation unit 12, the encryption key designation process in the encryption key designation unit 13 and the encryption process in the encryption unit 14, and the other is to end the encryption process and execute the image output process in the image output unit 16.

Here, it should be noted that the switching operation in the switching unit 15 can be executed by the operator through the image viewer 105 shown in FIG. 2. That is, the switching unit 15 is connected to the encryption area designation unit 12 if the new area is designated by the user, while the switching unit 15 is connected to the image output unit 16 if the end button 108 is depressed by the user.

Besides, for example, the predetermined number of times of the encryption process is previously registered in the RAM 115, the HD 116 or the like, and the counter for counting the number of times of the encryption process and judging whether or not the encryption process is executed by the number of times corresponding to the registered predetermined number is provided. Thus, it is possible to switch the operation according as the counter judges whether or not the number of times of the encryption process exceeds the registered predetermined number. More specifically, for example, the switching unit 15 is connected to the encryption area designation unit 12 if the counted number is equal to or smaller than the registered predetermined number, while the switching unit 15 is connected to the image output unit 16 if the counted number exceeds the predetermined number.

In any case, the present invention is not limited to this. That is, it is apparent that the switching process in the switching unit 15 can be executed in various methods.

Subsequently, the encrypted image data is finally output from the image output unit 16. In the image output unit 16, the image data is transmitted to the image delivery server 94, or once stored in the storage medium such as the RAM 115, the HD 116, the CD-ROM drive 117, the FD drive 118, the DVD-ROM drive 119 or the like.

Figure 6:
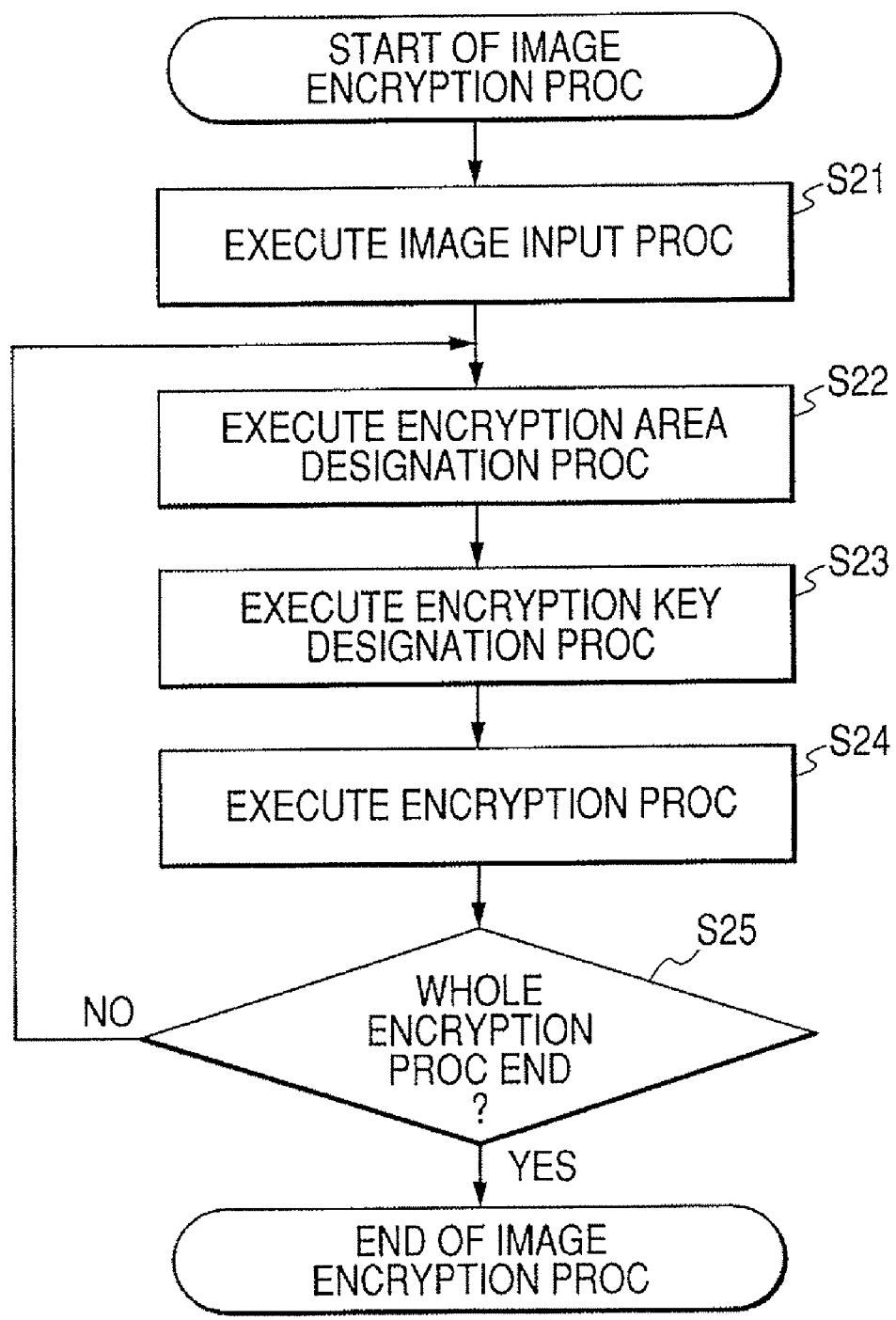
FIG. 6 is a flow chart showing the image encryption process according to the embodiment.

FIG. 6 is a flow chart showing the image encryption process which is applicable to the embodiment.

Initially, in a step S21, the image data is input. Then, in a step S22, the predetermined encryption area is designated. Subsequently, in a step S23, the key information corresponding to the encryption area designated in the step S22 is designated. After then, in a step S24, the image data corresponding to the area designated in the step S22 is subjected to the encryption process by using the key information designated in the step S23. After the encryption process was executed, it is judged in a step S25 whether or not the whole encryption process ends. Here, it is judged that the encryption process should be continued, the flow returns to the step S22. Meanwhile, if it is judged in the step S25 that the whole encryption process ends, the image encryption process ends.

As explained above, according to the embodiment, it is possible to execute the encryption process to the predetermined area of the image data plural times.

Incidentally, in the embodiment, as the encryption area which is designated in the encryption area designation process, a different area can be designated every time the encryption area designation process is executed. Likewise, as the key information which is used in the encryption process, different key information can be used every time the encryption process is executed.

Thus, the plural encryption areas are designated, and the encryption process is executed by using the different key information with respect to each encryption area. In that case, to correctly execute the image decryption process in the image reproduction processing unit at the later stage, it is necessary to record in the image data which key information is used with respect to which area. Here, how to record the encryption area information and the key information in the embodiment will be explained with reference to FIG. 7.

Figure 7:
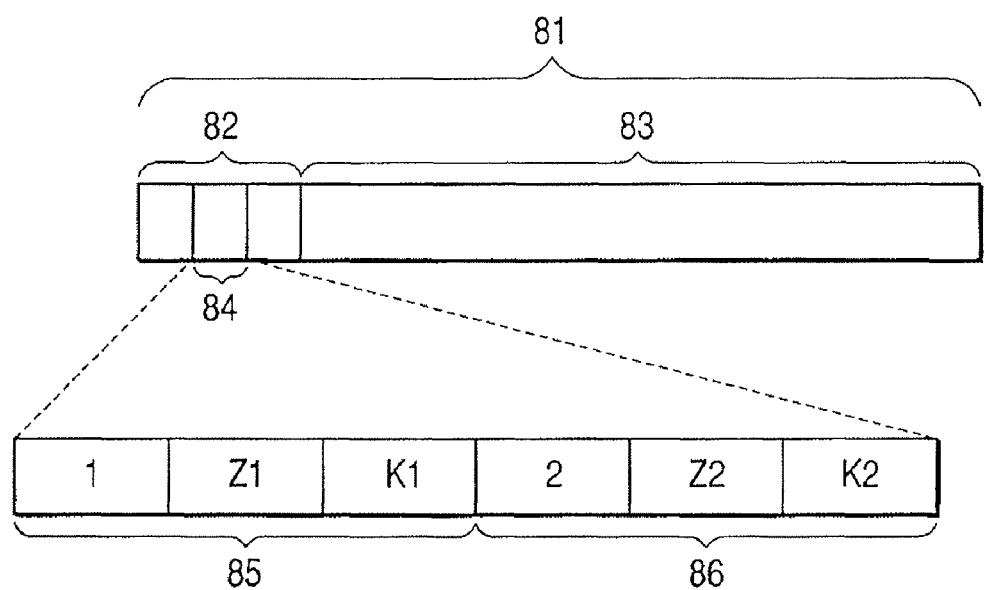
FIG. 7 is a diagram for explaining the recording method of the key information according to the embodiment.

FIG. 7 is the diagram for explaining the recording method of the area information and the key information according to the embodiment. Numeral 81 denotes whole image data, numeral 82 denotes header information for recording various parameters concerning the image data, numeral 83 denotes actual image data, numeral 84 denotes encryption related information, numeral 85 denotes first encryption related information, and numeral 86 denotes second encryption related information. Here, it is assumed in the embodiment that a first encryption process is first executed and thereafter a second encryption process is executed.

As shown in FIG. 7, in the embodiment, the encryption order information, the encryption area information and the key information are recorded as a part of the header information of the image data. Moreover, it should be noted that the first encryption related information 85 consists of encryption order information 1, first encryption area information Z1 and first key information K1, and the second encryption related information 86 consists of encryption order information 2, second encryption area information Z2 and second key information K2.

In the example shown in FIG. 7, the encryption process is initially executed as the first encryption process to the area indicated by the first encryption area information Z1 by using the first key information K1, and the encryption process is subsequently executed as the second encryption process to the area indicated by the second encryption area information Z2 by using the second key information K2. Since the relevant information is recorded in the header information 82, it is possible to notify the later-described image reproduction processing unit which area the encryption process is executed to by using which key in the image encryption process.

Incidentally, the identifiers which indicate the first key information and the second key information may be recorded as the key information Alternatively, it is possible to encrypt the first key information and the second key information by using third key information different from the first key information and the second key information, and then record the encrypted first key information and the encrypted second key information. Here, it should be noted that the encryption area information may be information of enabling to know which portion in the image data the encrypted area is located. For example, the encryption area information may be the pixel number or the coordinates of the image data, or may be the block number acquired when the image data is divided into the predetermined blocks.

Moreover, in the embodiment, the encryption order information, the encryption area information and the key information are recorded in the image data as shown in FIG. 7. However, it is apparent that the present invention is not limited to this. For example, the encryption order information, the encryption area information and the key information can be recorded as other data separated from the image data, and then transmitted to the image reproduction processing unit at the later stage.

Besides, it is assumed in the embodiment that, after the first encryption process was executed, the second encryption process is executed. However, it is needless to say that, after the second encryption process was executed, a third encryption process may be executed, that is, n-time multiple encryptions process may be executed. At that time, the n-th encryption related information (that is, encryption order information n, encryption area information Zn and key information Kn) encrypted by the encryption of the n-th time is recorded in the encryption related information 84 of the header information 82.

(Image Reproduction Process)

Figure 8:
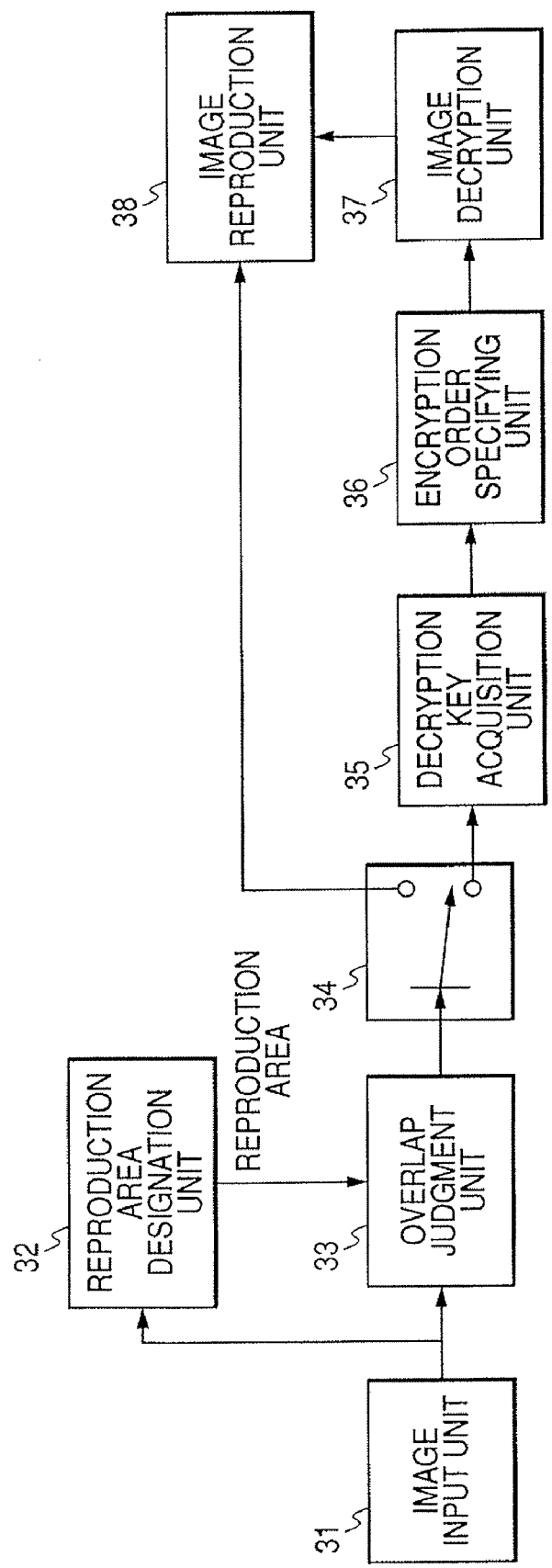
FIG. 8 is a block diagram for explaining the constitution of the image decryption processing unit.

FIG. 8 is a block diagram for explaining the image reproduction processing function and the method of achieving the image reproduction processing function, according to the embodiment. In FIG. 8, numeral 81 denotes an image input unit, numeral 32 denotes a reproduction area designation unit, numeral 33 denotes an overlap judgment unit, numeral 34 denotes a switching unit, numeral 35 denotes a decryption key acquisition unit, numeral 36 denotes an encryption order specifying unit, numeral 37 denotes an image decryption unit, and numeral 38 denotes an image reproduction unit.

Initially, the function of the image input unit 31 will be explained. That is, the image data intended to be reproduced is input to the image input unit 31, and the input image data is output from the image input unit 31 to the reproduction area designation unit 32 and the overlap judgment unit 33. In the embodiment, it is assumed that the image data which is output (that is, encrypted) by the image output unit 16 shown in FIG. 4 is input to the image input unit 31. In other words, the image data which is acquired by executing the second encryption process after executing the first encryption process is input to the image input unit 31.

Next, the function of the reproduction area designation unit 32 will be explained. That is, in the reproduction area designation unit 32, the image data intended to be reproduced is input, a desired reproduction area V in the input image data is designated, and the designated reproduction area V is output to the overlap judgment unit 33. Here, it should be noted that it is possible for the user to execute the reproduction area designation process in the reproduction area designation unit 32 by using the mouse 1114 or the like as browsing or consulting the image viewer 105 shown in FIG. 2. Alternatively, it is also possible to automatically designate the desired area previously registered in the RAM 115, the HD 116 and the like.

Incidentally, as the example of the area to be designated, the spatial area of the image is designated in the embodiment. However, the present invention is not limited to this. That is, it is apparent that the partial areas of various image data can be designated. For example, it is apparent that, in the image data of the JPEG 2000 system, the predetermined component can be designated, and the predetermined resolution level can be designated.

Subsequently, the function of the overlap judgment unit 33 will be explained. That is, the overlap judgment unit 33 judges whether or not there is an overlap between the encryption area and the reproduction area V by comparing the encryption area in the input (encrypted) image data with the reproduction area V designated by the reproduction area designation unit 32 at the previous stage. Then, the overlap judgment unit 33 controls the switching unit 34 according to the judged result.

In the embodiment, if it is judged that the reproduction area V does not overlap the encryption area, it is controlled to connect the switching unit 34 to the image reproduction unit 38. In the meanwhile, if it is judged that the reproduction area V overlaps the encryption area, it is controlled to connect the switching unit 34 to the decryption key acquisition unit 35. Here, it should be noted that the image data and the decryption related information are output to the connected image reproduction unit 38 or the decryption key acquisition unit 35.

Incidentally, in the embodiment, as shown in FIG. 7, it is possible to know the encryption area by analyzing the encryption related information 84 (that is, the first encryption area information Z1 and the second encryption area information Z2 of FIG. 7) of the header information 82 in the image data.

Here, the decryption related information according to the embodiment will be explained. That is, the decryption related information is the information which includes the overlap area information, the key information and the encryption order information which are necessary for the image decryption process in the image decryption unit 37 at the later stage. In the overlap judgment unit 33, only the overlap area information from among the overlap area information, the key information and the encryption order information is calculated and recorded in the decryption related information.

FIGS. 9A, 9B and 9C are diagrams for explaining the decryption related information which is applicable to the embodiment. In the overlap judgment unit 33, only the overlap area information as shown in FIG. 9A is recorded. Here, in FIG. 9A, a first overlap area VZ1 and a second overlap area VZ2 are calculated as follows by using the first encryption area information Z1, the second encryption area information Z2 and the reproduction area V.

$$VZ1 = Z1 \cap V \quad (1)$$

$$VZ2 = Z2 \cap V \quad (2)$$

That is, the first overlap area VZ1 is calculated as the product set of the first encryption area information Z1 and the reproduction area V as shown in the equation (1), and the second overlap area VZ2 is calculated as the product set of the second encryption area information Z2 and the reproduction area V as shown in the equation (2).

As a result of the equation (1), if the first overlap area VZ1 is not the empty set (that is, if it intends to reproduce the encrypted area), the calculated first overlap area VZ1 is correlated with the corresponding encryption area information and recorded in the decryption related information as shown in FIG. 9A. Likewise, as a result of the equation (2), if the second overlap area VZ2 is not the empty set (that is, if it intends to reproduce the encrypted area), the calculated second overlap area VZ2 is correlated with the corresponding encryption area information and recorded in the decryption related information as shown in FIG. 9A.

Figure 10A:
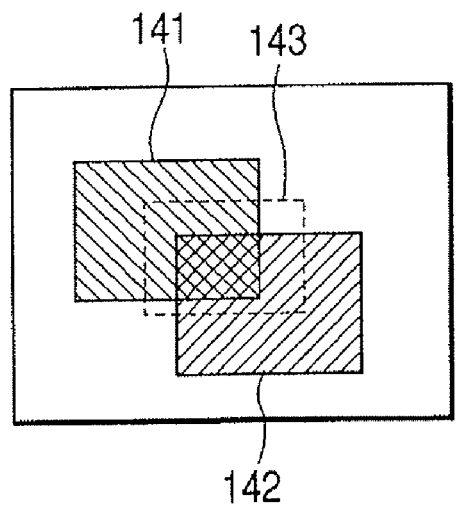
FIGS. 10A, 10B and 10C are diagrams for explaining examples of the overlap areas according to the embodiment.
Figure 10B:
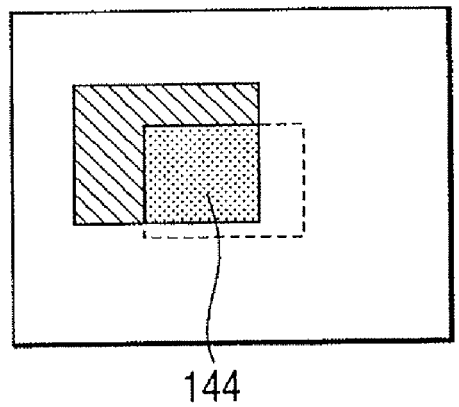
Figure 10C:
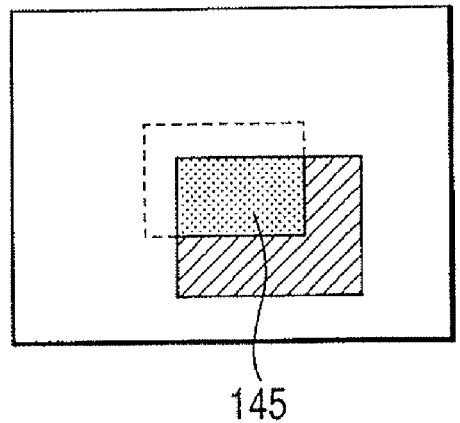

Here, examples of the overlap area will be explained with references to FIGS. 10A, 10B and 10C. That is, FIGS. 10A to 10C are the diagrams for explaining the examples of the overlap areas according to the embodiment. More specifically, in FIG. 10A, numeral 141 denotes a first encryption area (information) Z1, numeral 142 denotes a second encryption area (information), Z2, and numeral 143 denotes the reproduction area V. Besides, numeral 144 in FIG. 10B denotes the first overlap area VZ1, and numeral 145 in FIG. 10C denotes the second overlap area VZ2.

As shown in FIGS. 10A to 10C, the product set of the first encryption area 141 (Z1) and the reproduction area 143 (V) is calculated as the first overlap area 144 (VZ1) by using the equation (1), and the product set of the second encryption area 142 (Z2) and the reproduction area 143 (V) is calculated as the second overlap area 145 (VZ2) by using the equation (2).

Subsequently, the function of the decryption key acquisition unit 35 will be explained. That is, in the decryption key acquisition unit 35, the image data and the decryption related information are first input, the key information necessary in the image decryption unit at the later stage is acquired by using the input decryption related information, the acquired key information is additionally recorded in the decryption related information, and the acquired decryption related information is then output together with the image data.

Here, how to acquire the key information will be explained with reference again to FIGS. 9A to 9C. That is, in the decryption key acquisition unit 35, the decryption related information as shown in FIG. 9A is input from the overlap judgment unit 33 at the previous stage. Then, in the decryption key acquisition unit 35, the key information corresponding to each overlap area information is acquired by analyzing the header information (with use of the corresponding encryption area information) as shown in FIG. 7. Subsequently, as shown in FIG. 9B, the acquired key information is correlated with each overlap area information and added as "the key information".

In the embodiment, in the case where the identifier of the key is recorded (in the header information) as the key information, the key information is acquired by requesting the key server 92 to transmit the key information corresponding to the relevant identifier. Alternatively, as described above, in the case where the first key information and the second key information are encrypted by using the third key information, it only has to decrypt each encryptedkey information by using the third key information.

As explained above, in the decryption key acquisition unit 35, the key information corresponding to each overlap area is acquired.

Subsequently, the function of the encryption order specifying unit 36 will be explained. That is, in the encryption order specifying unit 36, the image data and the decryption related information are first input, it is then specified in what order the encryption process is executed with respect to the overlap area in the decryption related information, the specified encryption order information is additionally recorded in the decryption related information, and the acquired decryption related information is output together with the image data.

Here, how to specify the encryption order will be explained with reference again to FIGS. 9A to 9C. That is, in the encryption order specifying unit 36, the decryption related information as shown in FIG. 9B is input from the decryption key acquisition unit 34 at the previous stage. Then, in the encryption order specifying unit 36, it is specified in what order the respective overlap areas are encrypted, by analyzing the header information (with use of the corresponding encryption area information) as shown in FIG. 7. Subsequently, as shown in FIG. 9C, the specified image encryption order is correlated with the respective overlap areas and additionally recorded as the encryption order information.

As explained above, the encryption order of the respective overlap areas is specified in the encryption order specifying unit 36. Incidentally, in the embodiment, it is possible to output the decryption related information as shown in FIG. 9C to the image decryption unit 37 at the later stage as it is. However, since the encryption area information is unnecessary in the image decryption unit 37, it is also possible to erase the encryption area information.

Subsequently, the function of the image decryption unit 37 will be explained. That is, in the image decryption unit 37, the image data and the decryption related information are first input, the image decryption process is executed to the input image data by using the decryption related information, and the acquired image data is then output.

The detail of the image decryption process in the embodiment will be described later.

Thus, in the image reproduction unit 38, the output from the switching unit 34 or the image decryption unit 37 is finally output to the monitor 112. Besides, the output image data can be stored in the RAM 115, the HD 116, the CD-ROM drive 117, the FD drive 118 and the DVD-ROM drive 119. In addition, the output image data can also be transmitted to another computer through the Internet by the NIC 1110.

As described above, the image reproduction process which is applicable to the embodiment and the method of executing the image reproduction process are explained.

Figure 11:
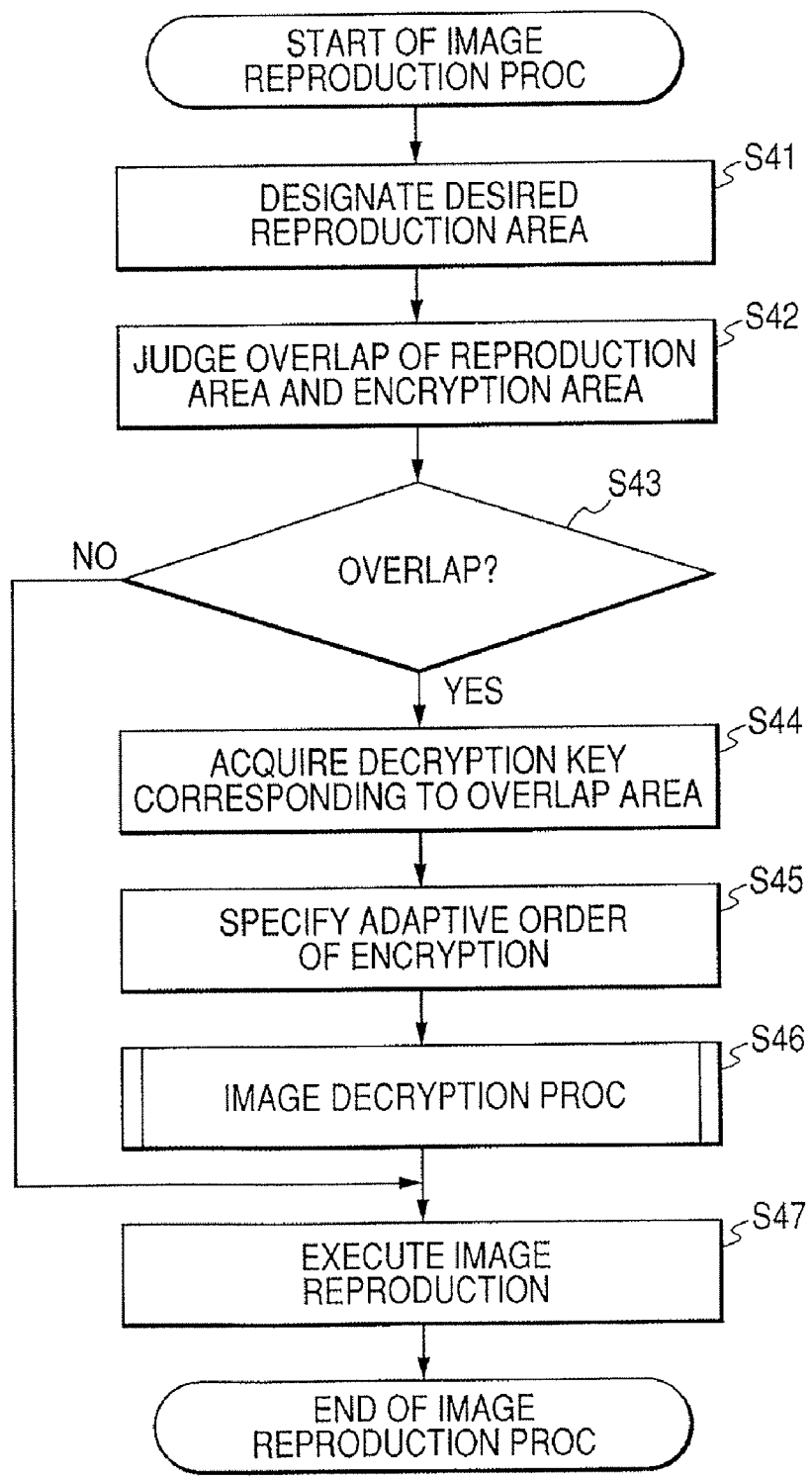
FIG. 11 is a flow chart showing the image decryption process according to the embodiment.

Subsequently, the flow of the above image reproduction process will be explained with reference to FIG. 11. That is, FIG. 11 is the flow chart for explaining the image reproduction process which is applicable to the embodiment.

Initially, the desired image area is first designated in a step S41, and the overlap between the reproduction area and the encryption area is judged in steps S42 and S43. Then, if it is judged that there is the overlap, the flow advances to a step S44, while if it is judged that there is no overlap, the flow advances to a step S47. Incidentally, the decryption key corresponding to the overlap area is acquired in the step S44, and then the adaptive order of the encryption is specified in a step S45. Subsequently, the image decryption process is executed in a step S46, and the image is finally reproduced in the step S47.

Figure 12:
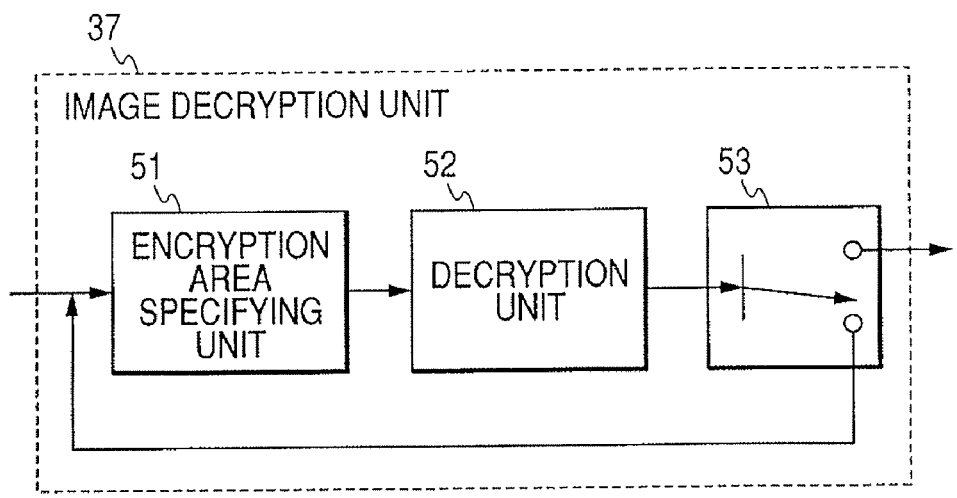
FIG. 12 is a block diagram for explaining the constitution of the image decryption unit according to the embodiment.

FIG. 12 is a block diagram for explaining the image decryption processing function and the method of achieving the image decryption processing function, according to the embodiment. More specifically, FIG. 12 shows the constitution of the image decryption unit 37 shown in FIG. 8. In the drawing, numeral 51 denotes an encryption area specifying unit, numeral 52 denotes a decryption unit, and numeral 53 denotes a switching unit.

Initially, the function of the encryption area specifying unit 51 will be explained. That is, in the encryption area specifying unit 51, the image data and the decryption related information (as shown in FIG. 9) are input, and then the overlap area information to be subjected to the decryption process, the corresponding key information and the image data are output by using the decryption related information.

Here, in the encryption area specifying unit 51, the output begins from the overlap area information corresponding to the record having the maximum value of the encryption order information in the decryption related information, and the key information. This is because the overlap area of which the encryption order information is larger is the area which has been encrypted later in the encryption step. That is, it is controlled in the embodiment that the area encrypted later is subjected to the decryption process earlier.

Subsequently, the function of the decryption unit 52 will be explained. That is, in the decryption unit 52, the overlap area information and the corresponding key information are input together with the image data, the area indicated by the overlap area in the image data is subjected to the decryption process by using the key information, and then the acquired image data is output.

In the decryption unit 52, the decryption process corresponding to the process to be executed in the encryption unit 14 shown in FIG. 4 is executed. Incidentally, it should be noted that the record corresponding to the overlap area subjected to the decryption process included in the decryption related information is erased (to indicate that the decryption process has been executed).

Next, the function of the switching unit 53 will be explained. That is, the switching unit 53 judges whether or not the overlap area to be subjected to the decryption process remains after the decryption process by the decryption unit 52 was executed. Then, if the record still remains in the decryption related information, the switching unit 53 is connected to the encryption area specifying unit 51. Meanwhile, if the record does not remain, the switching unit 53 is connected to the above image reproduction unit 38.

Figure 13:
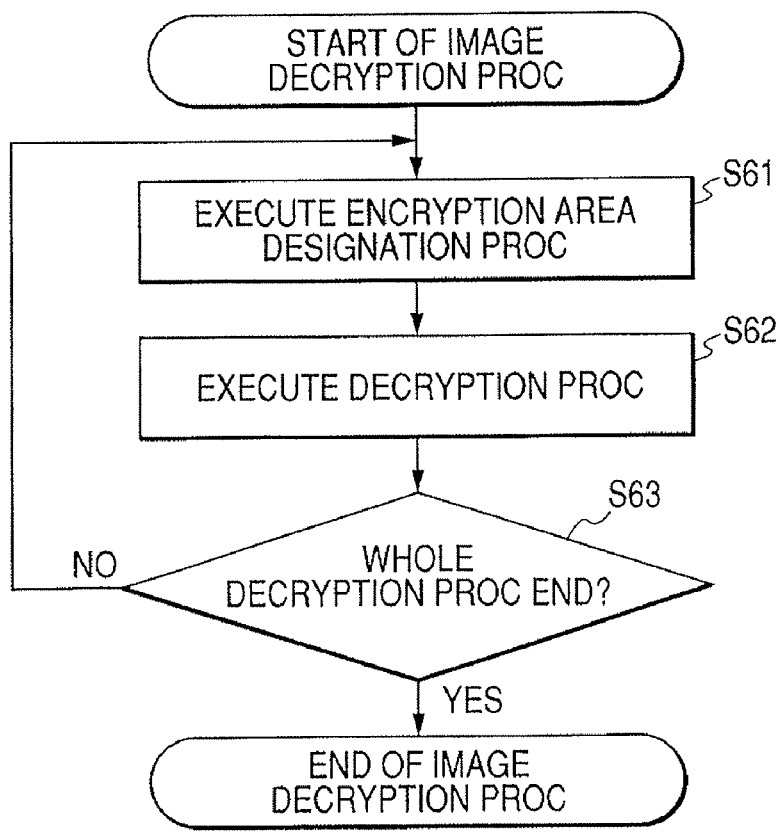
FIG. 13 is a flow chart showing the image decryption process according to the embodiment.

Subsequently, the flow of the above image decryption process will be explained with reference to FIG. 13. Here, FIG. 13 is the flow chart showing the image decryption process which is applicable to the embodiment.

Initially, in a step S61, the encryption area to be subjected to the decryption process is specified. Next, in a step S62, the decryption process is executed to the specified encryption area. After the decryption process was executed, it is judged in a step S63 whether or not the whole decryption process ends. Then, if it is judged that the whole decryption process does not end, the flow returns to the step S61. Meanwhile, if it is judged that the whole decryption process ends, the image decryption process ends.

Here, an example of the image reproduction capable of being achieved by the embodiment will be explained with reference to FIGS. 14A, 14B, 14C, 14D and 14E.

Figure 14A:
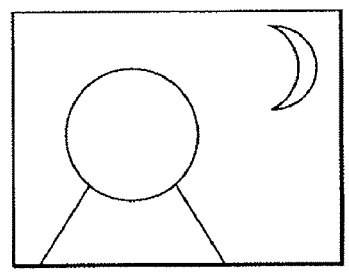
FIGS. 14A, 14B, 14C, 14D and 14E are diagrams for explaining an example of the image reproduction according to the embodiment.
Figure 14B:
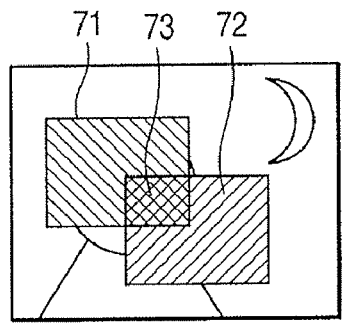

That is, FIGS. 14A to 14E are the diagrams for explaining the example of the image reproduction capable of being achieved by the embodiment. More specifically, FIG. 14A shows the image data which is not yet encrypted and thus to be encrypted. In addition, FIG. 14B shows the image data in which, after a first encryption process was executed to a first encryption area 71, a second encryption process is executed to a second encryption area 72. Here, numeral 73 in FIG. 14B denotes the product set of the first encryption area 71 and the second encryption area 72.

Figure 14C:
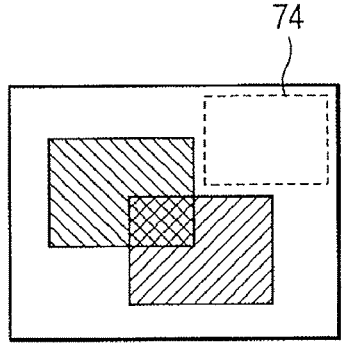

FIG. 14C explains a case where the first overlap area VZ1 and the second overlap area VZ2 are the empty sets. Here, numeral 74 in FIG. 14C denotes the reproduction area V in this case. When the reproduction area V is designated by the reproduction area designation unit 32, it is judged by the overlap judgment unit 33 that the reproduction area V 74 does not overlap the first encryption area 71 and the second encryption area 72. Thus, any decryption process is not executed, and the reproduction area V 74 is reproduced by the image reproduction unit 38.

Figure 14D:
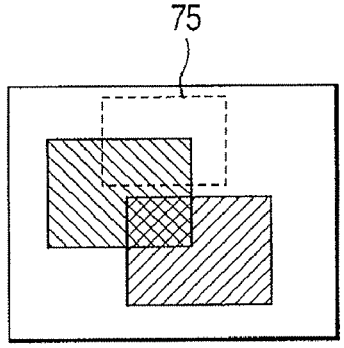

FIG. 14D explains a case where the first overlap area VZ1 is not the empty set (that is, the second overlap area VZ2 is the empty set). Here, numeral 75 in FIG. 14D denotes the reproduction area V in this case. When the reproduction area V 75 is designated by the reproduction area designation unit 32, it is judged by the overlap judgment unit 33 that the reproduction area V 75 overlaps only the first encryption area 71. As a result, the product set of the first encryption area 71 and the reproduction area V 75 is specified as the first overlap area VZ1. Further, the first key information K1 corresponding to the first encryption area 71 is acquired in the decryption key acquisition unit 35. After then, the decryption process corresponding to the first encryption process is executed by using the first key information K1 in the image decryption unit 37, and the reproduction area V 75 is reproduced in the image reproduction unit 38.

Figure 14E:
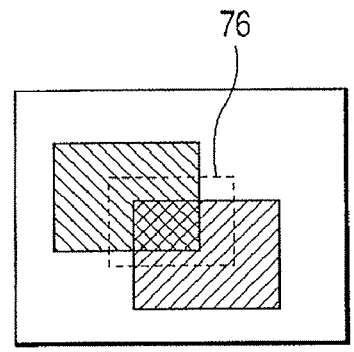

FIG. 14E explains a case where both the first overlap area VZ1 and the second overlap area VZ2 are not the empty set.

Here, numeral 76 in FIG. 14E denotes the reproduction area V in this case. When the reproduction area V 76 is designated by the reproduction area designation unit 32, it is judged by the overlap judgment unit 33 that the reproduction area V 76 overlaps both the first encryption area 71 and the second encryption area 72. As a result, the product set of the first encryption area 71 and the reproduction area V 76 is specified as the first overlap area VZ1, and the product set of the second encryption area 72 and the reproduction area V 76 is specified as the second overlap area VZ2. Further, in the decryption key acquisition unit 35, the first key information K1 corresponding to the first encryption area 71 is acquired, and the second key information K2 corresponding to the second encryption area 72 is acquired. Subsequently, in the encryption order specifying unit 36, it is judged that the second overlap area has been encrypted after the first overlap area had been encrypted, and the predetermined decryption process is executed in the image decryption unit 37. For the last time, the reproduction area V 76 is reproduced in the image reproduction unit 38.

Incidentally, the encryption is executed twice in the above explanation. However, it is needless to say that the present invention is also applicable to a case where the encryption is executed thrice or more. For example, if the first overlap area and the third overlap area are the empty sets and the second overlap area is not the empty set, the first key information corresponding to the first encryption area and the third key information corresponding to the third encryption area are respectively acquired in the decryption key acquisition unit 35. Subsequently, it is specified by the encryption order specifying unit 36 that the third overlap area has been encrypted after the first overlap area had been encrypted, and the process of decrypting the third encryption and decrypting the first encryption is executed in the image decryption unit 37.

Incidentally, in the embodiment, as the function of the reproduction area designation unit 32 shown in FIG. 8, the function to designate the desired reproduction area is explained by way of example. However, the present invention is not limited to this. That is, it is also possible as the function of the reproduction area designation unit 32 to designate a desired decryption area. In that case, the image data previously scrambled is displayed on the image viewer shown in FIG. 2. Then, in the reproduction area designation unit 32, that is, by using the rectangle 106, the blank column 1010 for the resolution level, the blank column 1011 for the layer and the blank column 1012 for the component, it only has to appropriately designate the image area to be subjected to the decryption process.

In any case, the embodiment according to the present invention is explained as above. Here, as previously explained, the device which encrypts the image data and decrypts the encrypted image data is the general-purpose information processing device such as an ordinary personal computer, and the above functions can be achieved by the computer program running on the personal compute. For this reason, it is apparent that the concept of the present invention includes the computer program. Moreover, typically, the computer program is stored in the computer-readable storage medium such as a CD-ROM or the like. Then, the relevant computer program can be executed by setting the computer-readable storage medium to the corresponding drive of the computer and installing the program stored in the set storage medium. For this reason, it is also apparent that the concept of the present invention includes the computer-readable storage medium itself.

According to the embodiment, when the partial-encrypted and multiple-encrypted image data is subjected to the partial decryption, it is possible to specify which of the relative areas has been subjected to the multiple encryption, whereby it is possible to prevent that the key which is unnecessary for the decryption is unnecessarily acquired. Moreover, it is possible to specify the decryption order with respect to the areas to be decrypted and reproduced, it is possible to prevent that the areas subjected the multiple encryption are wholly decrypted. Thus, it is safe in respect of security, and it is possible to prevent the useless decryption.

According to the present invention, it is possible to suitably execute the partial decryption for the image data to which the partial encryption and/or the multiple encryption have been executed.

In other words, the foregoing description of the embodiments has been given for illustrative purposes only and not to be construed as imposing any limitation in every respect.

The scope of the present invention is, therefore, to be determined solely by the following claims and not limited by the text of the specification and the alterations made within the scope equivalent to the scope of the appended claims fall within the true spirit and scope of the present invention.

This application claims priority from Japanese Patent Application No. 2004-259633 filed on Sep. 7, 2004, which is hereby incorporated by reference herein.

The invention claimed is:

1. An image reproduction method by which encrypted image data is reproduced, the encrypted image data having a partially encrypted first encryption area and a partially encrypted second encryption area, and at least the first encryption area and the second encryption area partially overlapping each other, comprising:
an area acquisition step of acquiring a partial desired reproduction area in the image data;
an overlap calculation step of calculating, using a central processing unit, a first overlap area, which is a product set of the first encryption area and the desired reproduction area, and a second overlap area, which is a product set of the second encryption area and the desired reproduction area;
a judgment step of judging whether the first overlap area calculated in said overlap calculation step is an empty set, because there is no overlap between the desired reproduction area and the first encryption area, and whether the second overlap area calculated in said overlap calculation step is an empty set, because there is no overlap between the desired reproduction area and the second encryption area;
a key information acquisition step of acquiring key information corresponding to an overlap area judged not to be an empty set, in a case where it is judged in said judgment step that at least one of the first overlap area and the second overlap area is not an empty set;
a decryption order specifying step of specifying a decryption processing order in the overlap area judged not to be an empty set, using information for specifying an encryption order of the first encryption area and the second encryption area; and
a decryption step of executing a decryption process, using the central processing unit, on the image data corresponding to the overlap area judged not to be an empty set, using the key information acquired in said key information acquisition step, in accordance with the decryption processing order specified in said decryption order specifying step.

2. An image reproduction method according to claim 1, wherein said key information acquisition step is adapted to at least acquire first key information corresponding to the first overlap area and second key information corresponding to the second overlap area.

3. An image reproduction method according to claim 1, further comprising a reproduction step of reproducing the image data of the partial desired reproduction area decrypted and acquired in said decryption step,
wherein, in a case where it is judged in said judgment step that both the first overlap area and the second overlap area are empty sets, said reproduction step reproduces the image data of the partial desired reproduction area without performing the processes in said key information acquisition step, said decryption order specifying step, and said decryption step.

4. An image reproduction device which reproduces encrypted image data, the encrypted image data having a partially encrypted first encryption area and a partially encrypted second encryption area, and at least the first encryption area and the second encryption area partially overlapping each other, comprising:
an area acquisition unit adapted to acquire a partial desired reproduction area in the image data;
an overlap calculation unit adapted to calculate a first overlap area, which is a product set of the first encryption area and the desired reproduction area, and a second overlap area, which is a product set of the second encryption area and the desired reproduction area;
a judgment unit adapted to judge whether the first overlap area calculated by the overlap calculation unit is an empty set, because there is no overlap between the desired reproduction area and the first encryption area, and whether the second overlap area calculated by the overlap calculation unit is an empty set, because there is no overlap between the desired reproduction area and the second encryption area;
a key information acquisition unit adapted to acquire key information corresponding to an overlap area judged not to be an empty set, in a case where it is judged by said judgment unit that at least one of the first overlap area and the second overlap area is not an empty set;
a decryption order specifying unit adapted to specify a decryption processing order in the overlap area judged not to be an empty set, using information for specifying an encryption order of the first encryption area and the second encryption area; and
a decryption unit adapted to execute a decryption process on the image data corresponding to the overlap area judged not to be an empty set, using the key information acquired by said key information acquisition unit, in accordance with the decryption processing order specified in said decryption order specifying unit.

5. An image reproduction device according to claim 4, wherein said key information acquisition unit is adapted to at least acquire first key information corresponding to the first overlap area and second key information corresponding to the second overlap area.

6. An image reproduction device according to claim 4, further comprising a reproduction unit adapted to reproduce the image data of the partial desired reproduction area decrypted and acquired by the decryption unit,
wherein, in a case where it is judged by the judgment unit that both the first overlap area and the second overlap area are empty sets, the reproduction unit reproduces the image data of the partial desired reproduction area without operating the key information acquisition unit, the decryption order specifying unit, and the decryption step.

7. A computer program, embodied in a non-transitory computer-readable medium, which is used to execute an image reproduction method by which encrypted image data is reproduced, the encrypted image data having a partially encrypted first encryption area and a partially encrypted second encryption area, and at least the first encryption area and the second encryption area partially overlapping each other, comprising a program code stored on the non-transitory computer-readable medium for causing a computer to execute:

an area acquisition step of acquiring a partial desired reproduction area in the image data;

an overlap calculation step of calculating, using a central processing unit, a first overlap area, which is a product set of the first encryption area and the desired reproduction area, and a second overlap area, which is a product set of the second encryption area and the desired reproduction area;

a judgment step of judging whether the first overlap area calculated in said overlap calculation step is an empty set, because there is no overlap between the desired reproduction area and the first encryption area, and whether the second overlap area calculated in said overlap calculation step is an empty set, because there is no overlap between the desired reproduction area and the second encryption area;

a key information acquisition step of acquiring key information corresponding to an overlap area judged not to be an empty set, in a case where it is judged in said judgment step that at least one of the first overlap area and the second overlap area is not an empty set;

a decryption order specifying step of specifying a decryption processing order in the overlap area judged not to be an empty set, using information for specifying an encryption order of the first encryption area and the second encryption area; and a decryption step of executing a decryption process, using the central processing unit, on the image data corresponding to the overlap area judged not to be an empty set, using the key information acquired in said key information acquisition step, in accordance with the decryption processing order specified in said decryption order specifying step.

8. A non-transitory computer-readable medium which stores a computer program to be used to execute an image reproduction method by which encrypted image data is reproduced, the encrypted image data having a partially encrypted first encryption area and a partially encrypted second encryption area, and at least the first encryption area and the second encryption area partially overlapping each other, said method comprising:

an area acquisition step of acquiring a partial desired reproduction area in the image data;

an overlap calculation step of calculating, using a central processing unit, a first overlap area, which is a product set of the first encryption area and the desired reproduction area, and a second overlap area, which is a product set of the second encryption area and the desired reproduction area;

a judgment step of judging whether the first overlap area calculated in said overlap calculation step is an empty set, because there is no overlap between the desired reproduction area and the first encryption area, and whether the second overlap area calculated in said overlap calculation step is an empty set, because there is no overlap between the desired reproduction area and the second encryption area;

a key information acquisition step of acquiring key information corresponding to an overlap area judged not to be an empty set, in a case where it is judged in said judgment step that at least one of the first overlap area and the second overlap area is not an empty set;

a decryption order specifying step of specifying a decryption processing order in the overlap area judged not to be an empty set, using information for specifying an encryption order of the first encryption area and the second encryption area; and a decryption step of executing a decryption process, using the central processing unit, on the image data corresponding to the overlap area judged not to be an empty set, using the key information acquired in said key information acquisition step, in accordance with the decryption processing order specified in said decryption order specifying step.

* * * * *